(12) United States Patent
Nagano (10) Patent No.: US 8,290,343 B2
(45) Date of Patent: Oct. 16, 2012

(54) ELECTRONIC APPARATUS, REPRODUCING METHOD AND PROGRAM

(75) Inventor: Kae Nagano, Tokyo (JP)

(73) Assignee: Sony Corporation, Tokyo (JP)

(*) Notice: Subject to any disclaimer, the term of this patent is extended or adjusted under 35 U.S.C. 154(b) by 199 days.

(21) Appl. No.: 12/596,857

(22) PCT Filed: Oct. 24, 2008

(86) PCT No.: PCT/JP2008/069344
§ 371 (c)(1),
(2), (4) Date: Oct. 21, 2009

(87) PCT Pub. No.: WO2009/054498
PCT Pub. Date: Apr. 30, 2009

(65) Prior Publication Data
US 2010/0129067 A1    May 27, 2010

(30) Foreign Application Priority Data
Oct. 26, 2007   (JP) ................. 2007-279565

(51) Int. Cl.
*H04N 9/80* (2006.01)
(52) U.S. Cl. .......... 386/248; 386/239; 386/240
(58) Field of Classification Search ............ 386/239, 386/240, 248
See application file for complete search history.

(56) References Cited

U.S. PATENT DOCUMENTS

| | | | | |
|---|---|---|---|---|
| 7,831,131 B2* | 11/2010 | Seo et al. | | 386/248 |
| 2003/0081943 A1 | 5/2003 | Kim et al. | | |
| 2006/0111145 A1 | 5/2006 | Kelly et al. | | |
| 2006/0140091 A1 | 6/2006 | Iwamoto et al. | | |
| 2006/0153016 A1 | 7/2006 | Seo et al. | | |
| 2007/0091357 A1 | 4/2007 | Konno et al. | | |
| 2007/0216934 A1* | 9/2007 | Yamada | | 358/1.15 |
| 2011/0273471 A1* | 11/2011 | Nagasaka et al. | | 345/619 |

FOREIGN PATENT DOCUMENTS

| | | |
|---|---|---|
| JP | 2005-92473 | 4/2005 |
| JP | 2006-155876 | 6/2006 |
| JP | 2006-340378 | 12/2006 |
| JP | 2007 128584 | 5/2007 |
| WO | 2005 045840 | 5/2005 |

OTHER PUBLICATIONS

European Search Report issued Jan. 2, 2012 in patent application No. 08842466.8.
Japanese Office Action mailed May 22, 2012, in Japanese Patent Application No. 2007-279565.

* cited by examiner

*Primary Examiner* — Thai Tran
*Assistant Examiner* — Mishawn Dunn
(74) *Attorney, Agent, or Firm* — Oblon, Spivak, McClelland, Maier & Neustadt, L.L.P.

(57) ABSTRACT

[Object] To download, even when a recording medium having content recorded thereon is not inserted in an electronic apparatus, subcontent related to the content.
[Solving Means] With a BD-ROM inserted in a recording/reproducing apparatus 100, a resident application in the recording/reproducing apparatus 100 reads metadata stored in the BD-ROM and stores the metadata in a disc library DB 34. When a BD-ROM is not inserted in the recording/reproducing apparatus 100, the resident application downloads the latest trailer from a content server 22 based on a URL of the content server 22 included in the metadata stored in the disc library DB 34, and then stores the latest trailer in a local storage 8. Accordingly, even when a BD-ROM is not inserted, the resident application can reproduce, via a disc library 30, the latest trailer stored in the local storage 8.

10 Claims, 8 Drawing Sheets

ELECTRONIC APPARATUS, REPRODUCING METHOD AND PROGRAM

TECHNICAL FIELD

The present invention relates to an electronic apparatus capable of reproducing content recorded on an optical disc and the like, and a reproducing method and program thereof executed in the electronic apparatus.

BACKGROUND ART

Conventionally, there has been adopted, in the BD-ROM (Blue-ray Disc Read-Only Memory) standard, a Java (registered trademark)-based application called BD-J (BD-Java (registered trademark)). This BD-J has interactive capability (capable of connecting to a network), and thanks to this capability, BD-ROM reproducing apparatuses are able to download content, applications and the like from a network and to reproduce them. Thus, the reproducing apparatuses can, for example, receive and reproduce content such as movie trailers, can download and display language subtitle information not recorded on a disc, and can download and run applications such as games related to the content recorded on a disc.

As an example, Patent Document 1 noted below discloses the technology with which a reproducing apparatus downloads, based on a URL (Uniform Resource Locator) given by a Java (registered trademark) application in BD-J mode, content through a network, and reproduces the content in the same way as for content recorded on a BD-ROM.

Patent Document 1: WO2005/045840 international publication (paragraphs [0106]-[0109])

DISCLOSURE OF THE INVENTION

Problem to be Solved by the Invention

Incidentally, content (hereinafter, referred to as subcontent) downloaded from a network by the reproducing apparatus by using the BD-J is stored in a local storage such as an HDD (Hard Disk Drive), and then the reproducing apparatus uses this subcontent and original content recorded on a BD-ROM to build a virtual file system. Accordingly, the reproducing apparatus can reproduce the subcontent in the local storage as if the subcontent were content on a BD-ROM.

However, in the current BD-J specification, the aforementioned interactive capability is effective so long as a BD-ROM is inserted in the reproducing apparatus. That is, unless a BD-ROM is inserted so as to activate a BD-J application, it is impossible for a reproducing apparatus to check the presence or absence of the latest subcontent such as the latest trailers or applications and/or to download such subcontent from a network. Here, it is preferable that the reproducing apparatus reproduce content on a BD-ROM and simultaneously download subcontent on a network in the background. The simultaneous reproducing and downloading of the reproducing apparatus, however, imposes a significant load on a system and thus may often be difficult. Moreover, even when the content on the BD-ROM is suspended from being reproduced, unless a broadband connection is available for the reproducing apparatus, it takes time to download the subcontent, forcing a user to wait.

In view of the circumstances as described above, an object of the present invention is to provide an electronic apparatus capable of, even when no recording medium having content recorded thereon is inserted therein, downloading subcontent related to the content from a network, and a reproducing method and program thereof for the electronic apparatus.

Means for Solving the Problem

To solve the above-mentioned problems, according to a primary aspect of the present invention, there is provided a electronic apparatus including an insertion portion into which a portable recording medium can be inserted, the recording medium having recorded thereon content, an application capable of receiving subcontent related to the content from a predetermined location on a network, and metadata of the content including location information indicating the predetermined location, a reading means for reading the metadata from the recording medium inserted in the insertion portion, a receiving means for receiving, when the recording medium is not inserted in the insertion portion, the subcontent from the predetermined location based on the location information in the read metadata, without using the application, and a reproducing means for reproducing the subcontent received by the application and the subcontent received without using the application. Here, examples of the content include video content such as movies and dramas, audio content such as music, and the like. Examples of the subcontent include, for a case in which the recorded content is a movie, a sequel thereto, trailers of other movies provided by the same provider as that movie, a so-called "making of" video clip, an interview video clip, an event video clip, language subtitle information of that movie, dubbed audio information, game applications related to that movie, and the like. Further, examples of the recording medium include optical discs such as a BD-ROM, DVD (Digital Versatile Disc)-ROM and CD (Compact Disc)-ROM, and semiconductor memories such as a memory card. Moreover, examples of the application include a Java (registered trademark) application (BD-J) provided with an interactive capability and the like. The predetermined location means a URL of a server retaining the subcontent.

With this configuration, by reading the metadata, the subcontent can be received without using the application. Thus, the subcontent can be reproduced even when the recording medium is inserted in the insertion portion, thereby providing a user with more opportunities to watch the subcontent. Accordingly, it is possible to give further-improved enjoyment to a user with respect to the content recorded on the recording medium, and also stimulate the demand for different new content. Moreover, it is possible to receive the subcontent in the background while no recording medium is inserted. Thus, a load imposed on the electronic apparatus can be alleviated as compared with a case in which reception and reproduction are performed only after the application is activated, and hence the subcontent can be promptly reproduced. This is particularly efficient in a place where no broadband connection is available.

In the electronic apparatus, the metadata may include recording medium identification information for identifying the recording medium. The electronic apparatus may further include a generation means for generating, based on the recording medium identification information, a content list indicating the content for each of the recording media, an output means for outputting a display signal for displaying subcontent identification information for each of the recording media on the generated content list, the subcontent identification information indicating presence of the subcontent that can be reproduced without using the application, and an entry means for inputting, via the content list, an operation of a user for causing the subcontent corresponding to the subcontent identification information to be reproduced. Here, "outputting a display signal" refers to a concept including not only a case in which the content list and subcontent identification information are displayed on a display portion incorporated in the electronic apparatus, but also a case in which the content list and subcontent identification information are sent to and displayed on a display apparatus connected to the electronic apparatus. The subcontent identification information may be an icon indicating the presence of the received subcontent, and may also be an emphasis effect such as the so-called highlight look or 3-D look given to respective display sections of the content on the content list. Accordingly, it is possible to display, even when no recording medium is inserted, the subcontent that can be reproduced for each of the recording media on the content list. Thus, even when the application for each of the recording media is not activated, a user can recognize the subcontent in connection with the recording media and the content before selecting the subcontent to be reproduced, and thus user-friendliness is increased. Moreover, content providers can stimulate new user demand for each of the recording media, and also can give improved enjoyment to a user.

In this case, the electronic apparatus may further include a storage means for storing the subcontent received by the application and the subcontent received without using the application, in correspondence with the recording medium identification information. The reproducing means may read, when the operation is input on the content list, the stored subcontent corresponding to the subcontent identification information from the storage means based on the recording medium identification information, to reproduce the subcontent. Accordingly, it is possible to store, even when the recording medium is not inserted, the subcontent in advance based on the location information. Thus, when an operation of a user is input, the contents can be reproduced more promptly as compared with a case in which the subcontent is received and reproduced by the application after the operation is input, thereby eliminating user waiting time and increase user-friendliness. It should be noted that storing by the storage means may be performed regularly, for example, at every 12:00 a.m., or may also be performed in the background while the electronic apparatus is turned off. Examples of this storage means include an HDD, a RAM (random access memory), a flash memory, and the like.

In this case, output means outputs, when the recording medium is inserted, a display signal for displaying a subcontent reproducing screen on which an operation of a user for causing the subcontent to be received by the application and reproduced is input. The reproducing means may reproduce, when the operation is input on the subcontents reproducing screen, the subcontent stored by the storage means without receiving the subcontent by use of the application. Accordingly, even when the subcontent reproducing operation is input during the activation of the application, it is possible to reproduce the subcontent that has already been stored based on the location information when no recording medium was inserted. Accordingly, the electronic apparatus promptly starts reproducing the subcontent, eliminating user waiting time and increasing user-friendliness. It should be noted that the subcontent reproduction screen is, for example, composed of a list of subcontent that can be received and reproduced, and one portion of the subcontent is selected from the list to thereby be reproduced.

Further, in this case, the subcontent may be encrypted. The receiving means may receive, when the operation is input on the subcontent reproducing screen, decryption key information for decrypting the encrypted subcontent from the predetermined location. The reproducing means may decrypt the subcontent stored by the storage means with the decryption key information to reproduce the subcontent. Accordingly, even when the subcontent is encrypted, it is possible to smoothly decrypt the encryption and promptly reproduce the subcontent by receiving, by use of the application, the decryption key information alone for decrypting the encryption, and performing reproduction using the subcontent that has already been stored by the storage means without using the application.

The storage means may store reproduction history information of the subcontent for each of the recording media every time the stored subcontent is reproduced. The output means output a display signal for displaying the subcontent identification information indicating, out of the stored subcontent, the presence of the subcontent that has not yet been reproduced based on the reproduction history information. Accordingly, irrespective of whether the subcontent is reproduced by use of the application or without using the application, by recording the reproduction history information of that subcontent, it is possible to display, on the content list, the subcontent identification information in respect of only the new subcontent that has never been viewed by the user, to thus prevent a user from useless watching owing to repeated watching of the subcontent.

The storage means may include means for removing the stored subcontent, and means for storing removal history information of the removed subcontent. The receiving means may receive, out of the subcontent that has not yet been stored, the subcontent other than the removed subcontent, based on the removal history information. Accordingly, it is possible to not only receive the subcontent that has not yet been stored, but also perform control for inhibiting the removed subcontent from being received. Accordingly, it is possible to not only allow a user to watch the up-to-date subcontent at any time, but also prevent a user from viewing unnecessary subcontent.

The storage means may include a first directory that stores, as first subcontent, the subcontent that is different for each recording medium, and a second directory that stores, as second subcontent, the subcontent that is common among the recording media. Moreover, the storage means may store, as the reproduction history information, first reproduction history information of the first subcontent and second reproduction history information of the second content. Here, examples of the second subcontent include, for example for a case in which the content provider is common, subcontent provided in common among the different recording media as the latest movie trailer of the content provider, and the like. Accordingly, by storing the second subcontent that is common among the different recording media separately from the first content, it is possible to eliminate data redundancy of the subcontent to be stored so as to increase storage efficiency. In addition, it is also possible to eliminate repeated downloading of the subcontent, thereby reducing the communications load of the electronic apparatus. Moreover, by storing the reproduction history information of the second subcontent separately from the reproduction history information of the first subcontent, it is possible to perform control for inhibiting, when the second subcontent is viewed based on the subcontent identification information displayed with respect to one portion of the content in the content list, the subcontent identification information from being displayed on the content list with respect to the rest of the content whose subcontent is common thereto. Thus, it is possible to prevent a user from repeated watching of the subcontent.

According to another aspect of the present invention, there is provided a reproduction method including reading, when a portable recording medium having recorded thereon content, an application capable of receiving subcontent related to the content from a predetermined location, and metadata of the content including location information indicating the predetermined location is inserted, the metadata from the recording medium, receiving, when the recording medium is not inserted in the insertion portion, the subcontent from the predetermined location based on the location information in the read metadata without using the application, and reproducing the subcontent received by using the application and the subcontent received without using the application.

According to yet another aspect of the present invention, there is provided a program for causing an electronic apparatus to execute the steps of reading, when a portable recording medium having recorded thereon content, an application capable of receiving subcontent related to the content from a predetermined location, and metadata of the content including location information indicating the predetermined location is inserted, the metadata from the recording medium, receiving, when the recording medium is not inserted in the insertion portion, the subcontent from the predetermined location based on the location information in the read metadata; and reproducing the subcontent received by using the application and the subcontent received without using the application.

Effect of the Invention

As described above, according to the present invention, even when a recording medium having content recorded thereon is not inserted in an electronic apparatus, the electronic apparatus can download subcontent related to the content from a network.

BEST MODES FOR CARRYING OUT THE INVENTION

Hereinafter, an embodiment of the present invention will be described with reference to the accompanying drawings.

Figure 1:
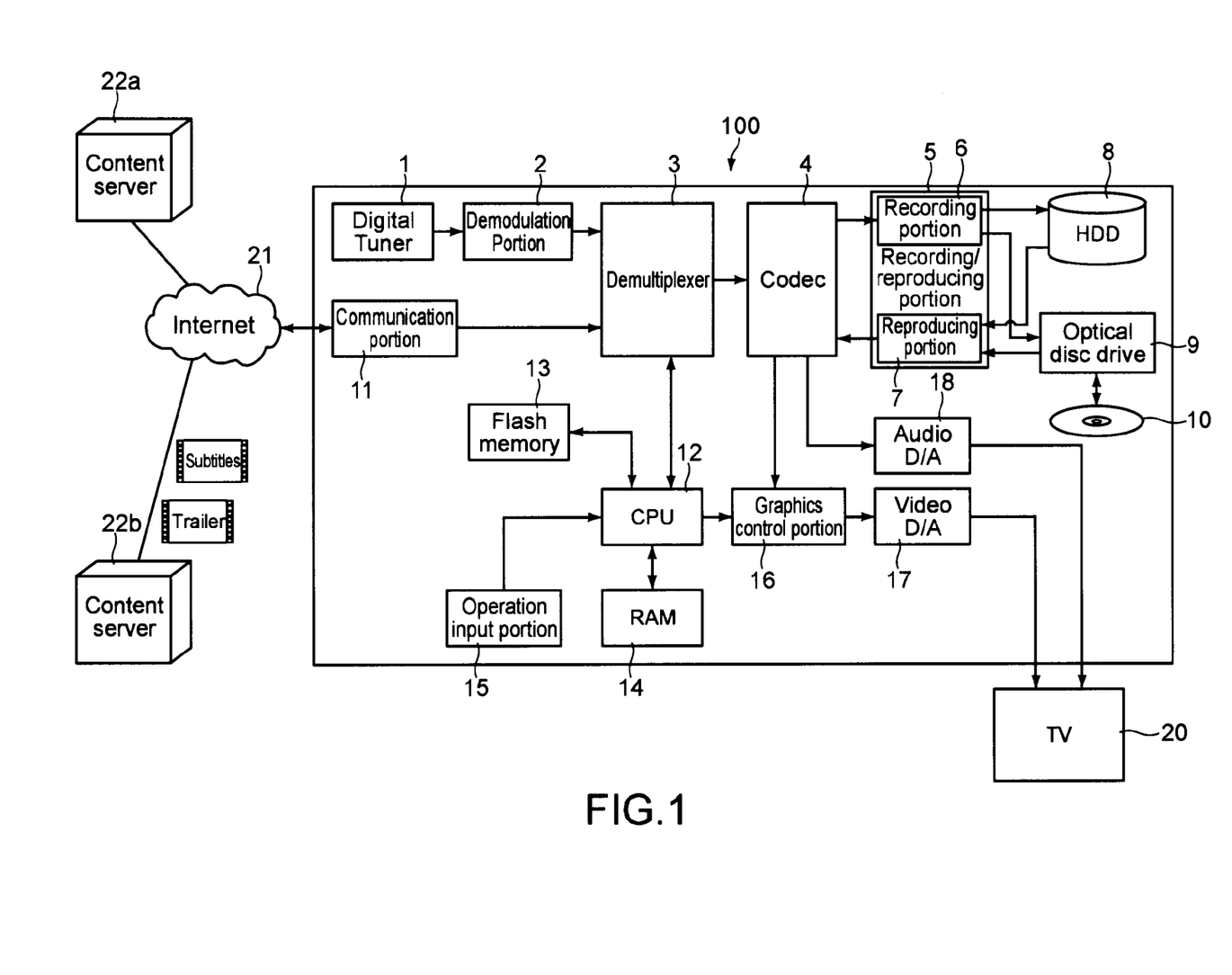
FIG. 1 A block diagram showing a configuration of a recording/reproducing apparatus according to one embodiment of the present invention.

FIG. 1 is a block diagram showing a configuration of a recording/reproducing apparatus according to one embodiment of the present invention. As shown in this figure, a recording/reproducing apparatus 100 according to this embodiment is connected to a television apparatus 20 (hereinafter, referred to as TV 20) as a display portion and is also connected to a plurality of content servers 22 (22a and 22b) via the Internet 21.

The content servers 22 are individually managed by creators of BD-ROMs on which content is recorded (content providers), for example, movie distributors. The content servers 22 store content for the publicity purposes of the content providers (hereinafter, collectively referred to as subcontent) including, for example, the latest movie trailers, language subtitle information unrecorded on BD-ROMs, game applications related to content recorded on BD-ROMs, "making of" video clips, interview video clips, event video clips, and the like. This subcontent is downloaded by the recording/reproducing apparatus 100 via the Internet 21.

The recording/reproducing apparatus 100 includes a digital tuner 1, a demodulation portion 2, a demultiplexer 3, a codec 4, a recording/reproducing portion 5, an HDD 8, an optical disc drive 9, a communication portion 11, a CPU (Central Processing Unit) 12, a ROM (Read Only Memory) 13, a RAM 14, an operation entry portion 15, a graphics control portion 16, a video D/A (Digital/Analog) converter 17, and an audio D/A (Digital/Analog) converter 18.

In accordance with control from the CPU 12, the digital tuner 1 selects a specific digital broadcast channel via an antenna (not shown), and then receives a broadcast signal including broadcast program data. This broadcast signal forms, for example, a MPEG stream that has been coded in MPEG-2TS format. However, the format is not limited to this. The demodulation portion 2 demodulates the broadcast signal that has been modulated.

The demultiplexer 3 separates the multiplexed broadcast signal into a video signal and an audio signal. The codec 4 individually decodes the video and audio signals that have been separated by the demultiplexer 3 and compressed. Further, the codec 4 can transcode one format to another for each of the signals in accordance with destinations to which the video and audio signals are outputted.

The recording/reproducing portion 5 includes a recording portion 6 and a reproducing portion 7. The recording portion 6 temporarily retains the video and audio signals decoded by the codec 4, and outputs those signals to the HDD 8 or the optical disc drive 9 to be recorded therein while controlling timing and data amount. The reproducing portion 7 reads the video and audio signals of the content recorded on the HDD 8 or an optical disc 10, and outputs them to the codec 4 to be reproduced while controlling timing and data amount.

The HDD 8 stores, on an incorporated hard disk, a variety of content including not only the broadcast program data received via the digital tuner 1 but also the above-described subcontent received from the content servers 22 on the Internet 21 and various video content, still image content, music content, etc. inputted via various interfaces (not shown) from outside apparatuses such as a digital camera. Further, the HDD 8 stores various programs such as an OS (operating system) and applications, and other data. In addition, the HDD 8 stores a disc library in which the content on BD-ROMs is listed for each of the discs. At the time of reproducing such stored data, the HDD 8 reads the stored data from the hard disk, and outputs the data to the recording/reproducing portion 5.

The optical disc drive 9 includes an insertion portion (not shown) into which the optical disc 10 can be inserted (loaded), and similarly to the HDD 8, the optical disc drive 9 can record various kinds of data including the program content on the optical disc 10 inserted in the insertion portion, and can read data recorded on the optical disc. It should be noted that examples of the optical disc 10 include not only the BD-ROM, but also a DVD and a CD.

The communication portion 11 is a network interface for connecting to the Internet 21 so as to download the subcontent from the content servers 22 by use of a protocol such as TCP/IP (Transmission Control Protocol/Internet Protocol).

The CPU 12 accesses the RAM 14 and the like whenever necessary and collectively controls any blocks inside the recording/reproducing apparatus 100. For example, the CPU 12 controls processes in the recording/reproducing apparatus 100, such as a process of reproducing content recorded on a BD-ROM, and a process of reproducing subcontent by use of BD-J and resident applications, which will be described later.

The ROM 13 is a nonvolatile memory in which firmware including programs and various parameters is fixedly stored. The RAM 14 is used as a working area, etc. of the CPU 12 and is a memory in which OSs, programs, data to be processed and the like are temporarily retained.

The operation entry portion 15 receives various setting values and/or commands inputted by user operations from, for example, a remote controller (not shown) equipped with a plurality of keys, and outputs them to the CPU 12. Needless to say, the operation entry portion 15 is not limited to a remote controller, and may be composed of a keyboard and/or a mouse connected to the recording/reproducing apparatus 100, and/or a switch mounted on the recording/reproducing apparatus 100.

The graphics control portion 16 performs graphics processes such as an OSD (On Screen Display) process on the video signal outputted from the codec 4 or data outputted from the CPU 12, and generates a video signal to be displayed on the television apparatus 20.

The video D/A converter 17 converts a digital video signal inputted from the graphics control portion 16 into an analog video signal, and outputs the analog video signal to the television apparatus 20.

The audio D/A converter 18 converts a digital audio signal inputted from the codec 4 into an analog audio signal, and outputs the analog audio signal to a display portion of the TV 20.

The television apparatus 20 displays the analog video signal on a display portion thereof (not shown), and outputs the analog audio signal from a loud speaker thereof or an outside loud speaker (not shown).

Figure 2:
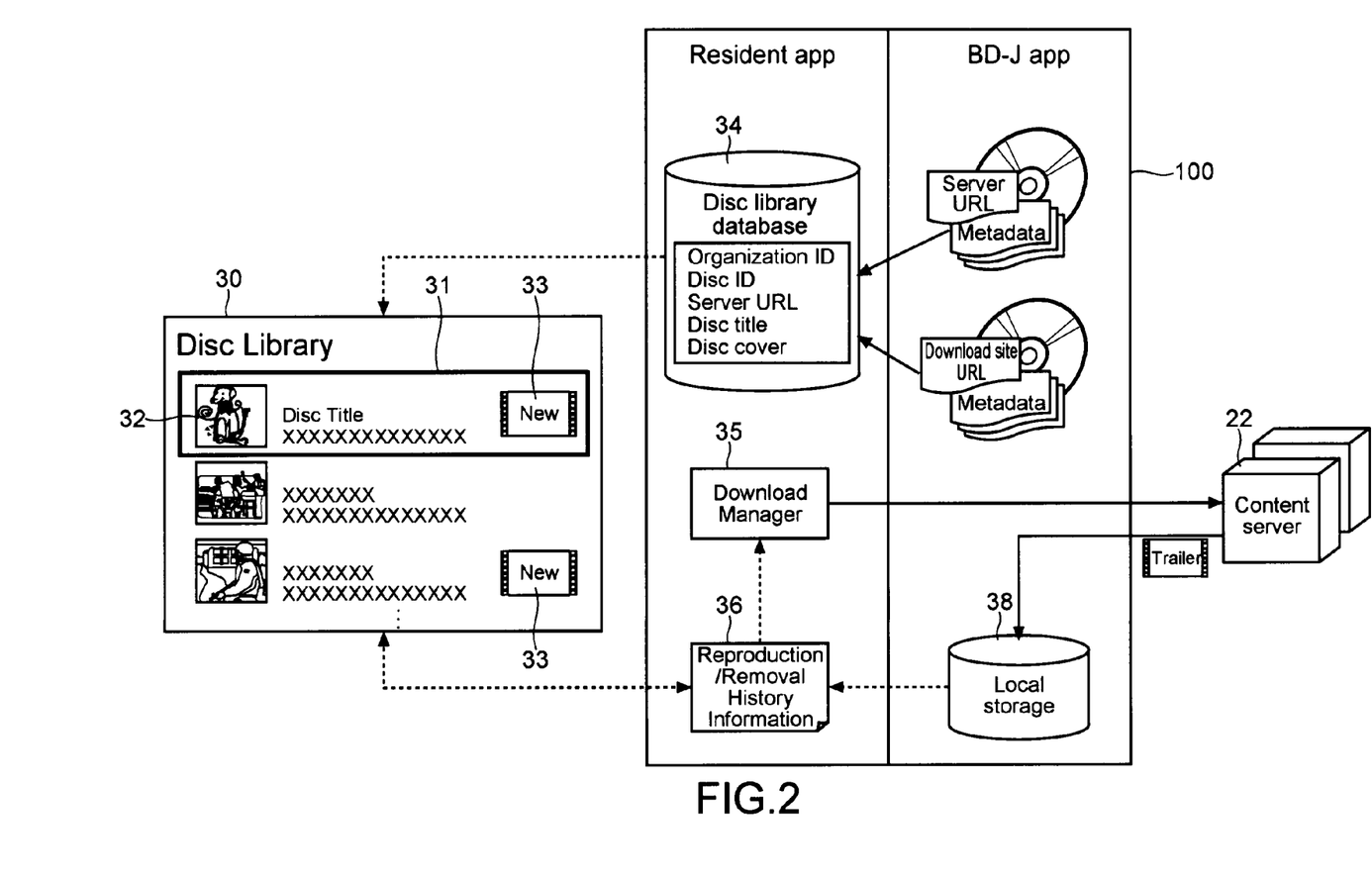
FIG. 2 A conceptual diagram showing a structure of applications executed in the recording/reproducing apparatus according to this embodiment of the present invention.

FIG. 2 is a conceptual diagram showing a structure of applications executed in the recording/reproducing apparatus 100. As shown in this figure, in the recording/reproducing apparatus 100, a BD-J application (hereinafter, referred to as BD-J app) that is a Java (registered trademark)-based application stored in the BD-ROM and a resident application (hereinafter, referred to as resident app) that is an application specific to the recording/reproducing apparatus 100 run.

The BD-J app is stored in the BD-ROM inserted in the optical disc drive 9 mentioned above. The BD-J app retains URLs for downloading the subcontent such as the trailers from the content servers 22. The BD-J app, with the BD-ROM inserted in the recording/reproducing apparatus 100, accesses the content servers 22 based on the URLs, and when the latest subcontent is present there, that app downloads the subcontent and stores it in a local storage 38 on the HDD 8. Moreover, the BD-J app builds a virtual file system from the content such as movies recorded on BD-ROMs (hereinafter, referred to as original content) and the subcontent such as the trailers stored in the local storage 38. Accordingly, the BD-J app reproduces the original content and the subcontent as if they were both stored in a single BD-ROM, without making a user conscious of which of the BD-ROM and local storage 38 the content and subcontent are stored.

On the other hand, the resident app reads metadata from the BD-ROM when inserted, puts that metadata, for each disc, into a database as a disc library database 34 (hereinafter, referred to as disc library DB 34) to be stored, for example, on the HDD 8. According to the BD-ROM standard, in addition to the original content of video and audio, general information such as an organization ID for identifying each provider of the original content, a disc ID for identifying each BD-ROM, a title of the original content, and a image of a disc cover are defined as the metadata. However, according to the BD-ROM standard, there is also an extended area within which disc makers are permitted to originally define the metadata. Here, in this embodiment, as new metadata, URLs for downloading the subcontent from the content servers 22 are recorded in the extended metadata area inside the BD-ROM. Thus, the resident app stores the standard-compliant metadata and also the URLs in the disc library DB 34.

In addition, a download manager 35 of the resident app, without any BD-ROM inserted in the recording/reproducing apparatus 100, accesses the content servers 22 using the URLs stored in the disc library DB 34, and then checks whether or not the latest subcontent is present. When the latest subcontent is present there, the download manager 35 downloads the subcontent, and then stores the subcontent in the local storage 38.

The resident app stores reproduction/removal history information 36 of the subcontent stored in the local storage. Then, the download manager 35 refers to this reproduction/removal history information and controls the subcontent so as not to download the reproduced and removed subcontent again.

Moreover, the resident app causes the disc library 30 to be displayed on the display portion of the TV 20 based on the metadata stored in the disc library DB 34. This disc library 30 is a list of the original content recorded on the individual BD-ROMs. Specifically, on the disc library 30, titles and/or disc cover images 32 of the original content are shown. Further, in respect of a certain BD-ROM, when the download manager 35 determines that the latest subcontent is present, a "New" icon 33 indicating the presence of the latest subcontent is displayed in a display section of that BD-ROM on the disc library 30. A user selecting this "New" icon 33 via the operation entry portion 15 causes the latest subcontent to be reproduced. This reproducing process will be described in detail later.

Figure 3:
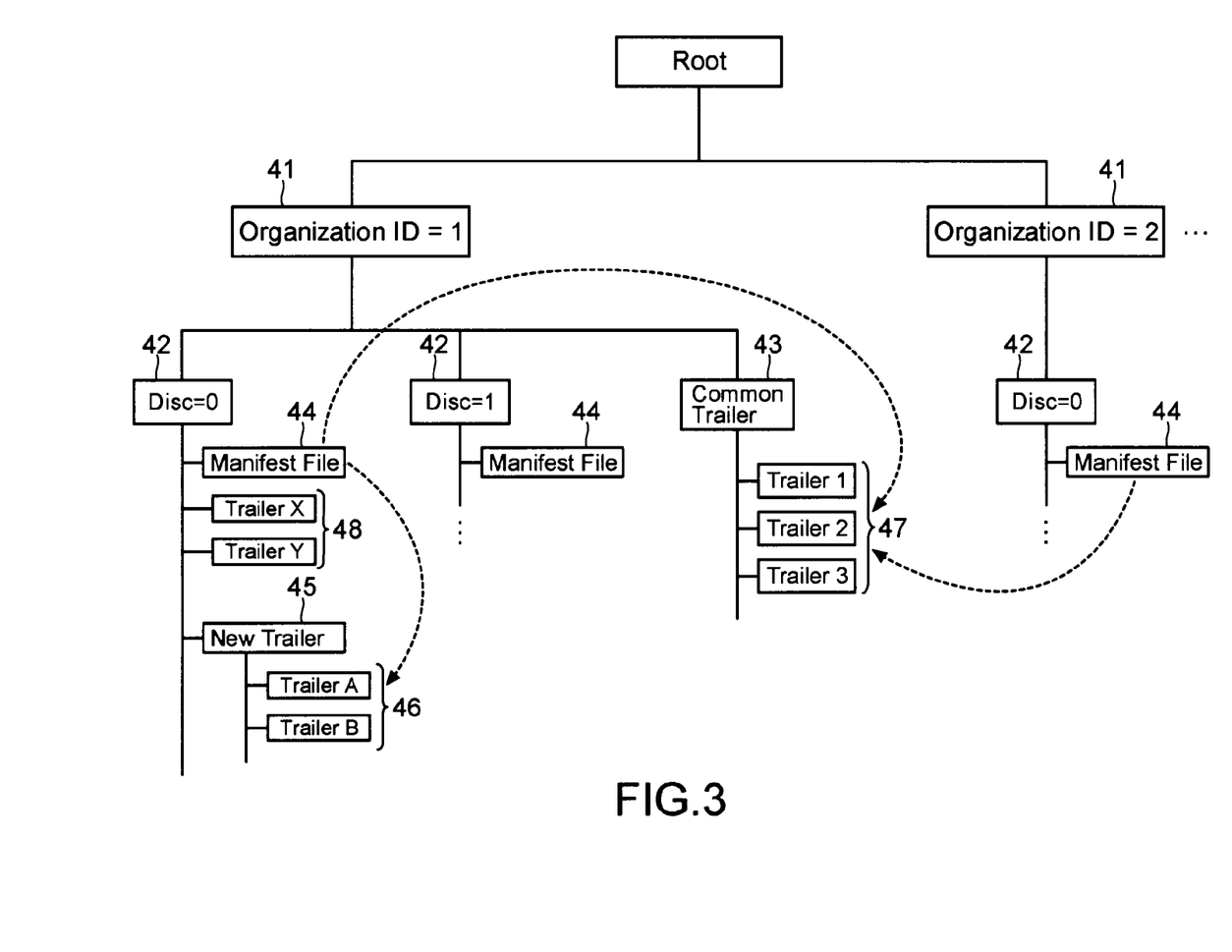
FIG. 3 A diagram showing a directory hierarchy of subcontent stored in a local storage in this embodiment of the present invention.

FIG. 3 is a diagram showing a directory hierarchy of the subcontent stored in the local storage 38. It should be noted that, hereinafter, it is assumed that the trailers are stored as the subcontent.

As shown in FIG. 3, the local storage 38 includes an organization directory 41 under a root directory. This organization directory 41 is set for each organization ID (ID=1, 2, . . . ) stored in the disc library DB 34.

Under each organization directory 41 are provided a specific directory 42 for storing a trailer that is specific to each individual BD-ROM and a common directory 43 for storing a trailer that is common among a plurality of BD-ROMs. The specific directory 42 is set for each disc ID (ID=0, 1, . . . ) stored in the disc library DB 34.

Under each specific directory 42 is provided a latest trailer directory 45, and in the latest trailer directory 45, among the latest trailers, specific trailers 46 (trailers A and B) that are specific to each individual BD-ROM are stored. Moreover, in each specific directory 42, trailers that have already been reproduced are stored as reproduced trailers 48 separately from the specific trailers 46.

Under the common directory 43 are stored common trailers (trailers 1-3) presented in common among the organization directories 41.

Moreover, under each specific directory 42 is also stored a manifest file 44. In this manifest file 44, files to be referred to are bound together for each BD-ROM and are written in a list. That is, the manifest file 44 contains a list of the specific and common trailers 46 and 47 that are the latest trailers. For example, in the organization directory 41 with the organization ID=1, the specific trailers A and B, and the common trailers 1-3 are bound together. This manifest file 44 is written in a markup language such as XML (Extensible Markup Language) and is downloaded in advance from the content server 22 by the BD-J app, when the BD-ROM is inserted, for example.

It should be noted that the common trailers 47 may be common in one organization directory 41 and may also be common among a plurality of the organization directories 41 (for example, those with organization IDs=1 and 2).

The BD-J app and the resident app respectively refer to this manifest file 44, and when running, they perform control whereby the specific trailers 46 and the common trailers 47 can be presented together to a user as trailers of one BD-ROM. This process will be described in detail later.

Thus, By providing not only the specific directory 42 specific to each BD-ROM but also the common directory 43 and storing the common trailers 47 under the common directory 43, it is possible to prevent an overlapping of the files for the trailers so as to improve storage efficiency, and prevent repeated downloads so as to alleviate the load imposed on the system of the recording/reproducing apparatus 100.

Next, an operation of the recording/reproducing apparatus 100 configured as described above will be described.

Figure 4:
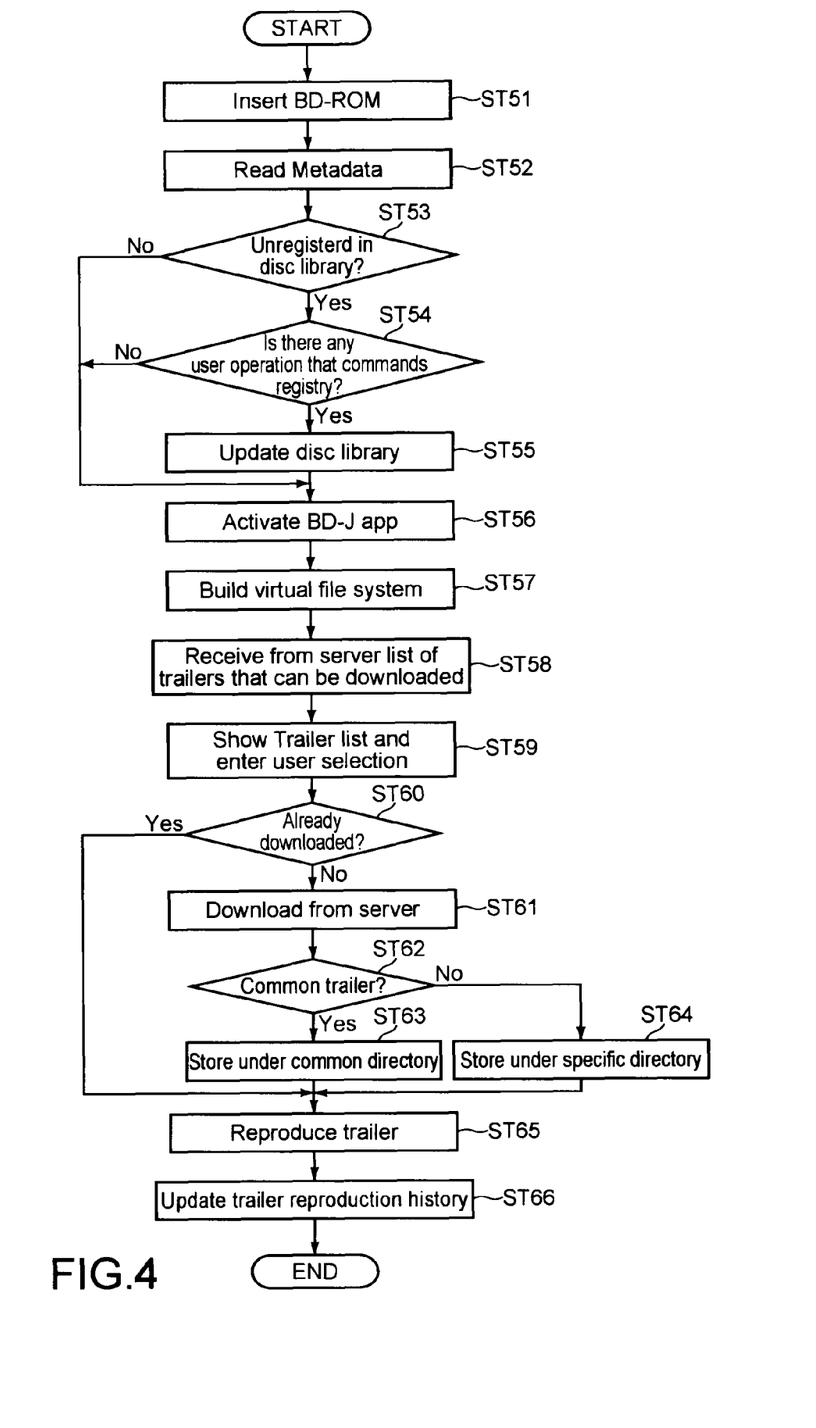
FIG. 4 A flowchart showing a flow of an operation in a case where a BD-ROM is inserted in the recording/reproducing apparatus.

First, an operation of the recording/reproducing apparatus 100 in a case where a BD-ROM is inserted therein will be described. FIG. 4 is a flowchart showing the flow of this operation.

As shown in FIG. 4, when a BD-ROM is inserted in the insertion portion of the recording/reproducing apparatus 100 (Step 51), the CPU 12 of the recording/reproducing apparatus 100 causes the recording/reproducing portion 5 and the resident app to read the metadata from the BD-ROM (Step 52). As described above, this metadata includes an organization ID, a disc ID, URLs of the content servers 22, and a title and a disc cover image of the original content.

Subsequently, the resident app determines whether or not the read metadata has already been registered in the disc library DB 34 (Step 53). When the metadata is not yet registered (Yes), the resident app causes the display portion of the TV 20 to display a screen for prompting the user to select whether or not to register the metadata. Then, the resident app determines whether or not a user operation that commands registry of the metadata is input on this selection screen (Step 54), and when the registry is commanded (Yes), the resident app updates the disc library DB 34 with the read metadata (Step 55).

When the registry in the disc library DB 34 is completed in this way, the CPU 12 moves onto an operation of reproducing the trailers. First, the CPU 12 activates the BD-J app on the BD-ROM (Step 56), and then builds a virtual file system from the original content on the BD-ROM and the subcontent in the local storage 38 (Step 57).

Subsequently, the BD-J app accesses the content servers 22 based on the URLs of the content servers 22 retained by the app itself, and then receives a list of the trailers that can be downloaded from the content servers 22 (Step 58). It should be noted that, in parallel with this reception, the manifest file 44 for each BD-ROM is also downloaded and stored in the local storage 38. Then, the BD-J app causes the display portion of the TV 20 to display the trailer list, so that the user can input, via a remote controller or the like, an operation of selecting reproduction of one of the trailers listed in the trailer list (Step 59).

Reception and display of this trailer list can be performed by a user selecting, for example, a "reproducing trailer" menu from a menu screen of the original content with a remote controller or the like during reproduction of the original content, for example. In this embodiment, this trailer list display screen is referred to as trailer reproducing screen.

Figure 5:
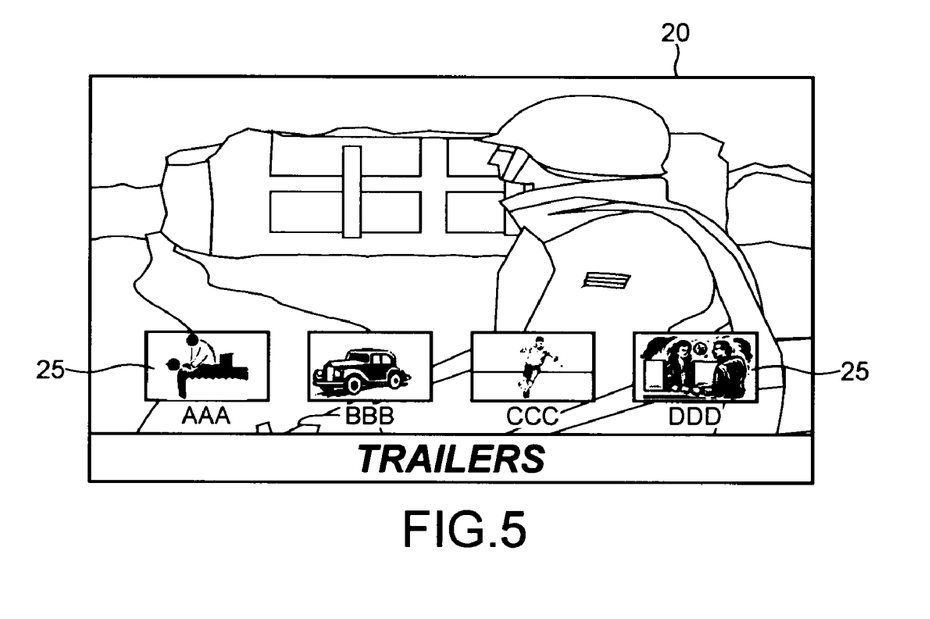
FIG. 5 A diagram showing an example of a trailer reproducing screen displayed on a TV apparatus in this embodiment of the present invention.

FIG. 5 is a diagram showing an example of the trailer reproducing screen.

As shown in FIG. 5, on the trailer reproducing screen, thumbnail images 25 of the trailers that can be reproduced are, for example, superimposed on picture of the original content with PinP (Picture in Picture) so as to be displayed on the display portion of the TV 20. Below each of the thumbnail images 25, the title of the original content from which the trailer of that image originates, etc. is shown. A user selects one of the thumbnail images 25 via the remote controller or the like so as to thereby input a request for reproduction of a trailer corresponding to that thumbnail image 25. As described earlier, the thumbnail images 25 shown on this trailer reproducing screen include thumbnails not only of the common trailers 46 but also of the common trailers 47.

Returning to FIG. 4, when such selection is input by a user, the BD-J app determines whether or not this trailer has already been downloaded (Step 60). That is, the BD-J app refers to the local storage 38 and checks whether or not the selected trailer has already been downloaded and stored by the resident app when the recording/reproducing apparatus 100 is in a stand-by state, etc.

When the BD-J app determines that the selected trailer has not yet been downloaded (No), the BD-J app accesses the content server 22 based on the URL, to download the selected trailer (Step 61).

Subsequently, the BD-J app refers to the manifest file 44 stored in the local storage 38 to thereby determine whether the download target trailer is the common trailer 47 or the specific trailer 46 (Step 62). Then, when the BD-J app determines whether or not the download target trailer is the common trailer 47 (Yes), the BD-J app creates the organization and common directories 41 and 43 based on the read metadata in the local storage 38 and stores the download target trailer under the common directory 43 (Step 63). Further, when the BD-J app determines that the download target trailer is the specific trailer 46 (No), the BD-J app creates the organization and specific directories 41 and 42 in the local storage 38 and stores the download target trailer under the common directory 42 (Step 64).

Then, the BD-J app reads the trailer stored in the local storage 38, and causes that trailer to undergo a decoding process performed by the codec 4 and an analog conversion process performed by the video D/A converter 17 and audio D/A converter 18 and then to be reproduced by the display portion and the loud speaker of the TV 20 (Step 65). When this happens, the resident app updates a reproduction history of the reproduced trailer as the reproduction/removal history information 36 (Step 66).

Moreover, in Step 60, when the BD-J app determines that the selected trailer has already been downloaded (Yes), the BD-J app searches for that trailer among those stored in the local storage 38 based on the read metadata and reads the trailer to be reproduced (Step 65). Also in this case, the trailer reproduction history is updated (Step 66).

Although this is not shown in any figure, when the BD-J is running, the trailer is, for example, reproduced on the reproducing screen that has undergone a decorative graphics process unique to each original content. This gives improved enjoyment to the user.

With the process described above, in the recording/reproducing apparatus 100, even when a BD-ROM is inserted therein and the BD-J app is running, so long as a trailer requested for reproduction by a user has already been downloaded by the resident app, that trailer can be reproduced without being downloaded again by the BD-J app. Accordingly, it is possible to alleviate the system load required for downloading.

Next, an operation in a case where no BD-ROM is inserted in the recording/reproducing apparatus 100 will be described.

Figure 6:
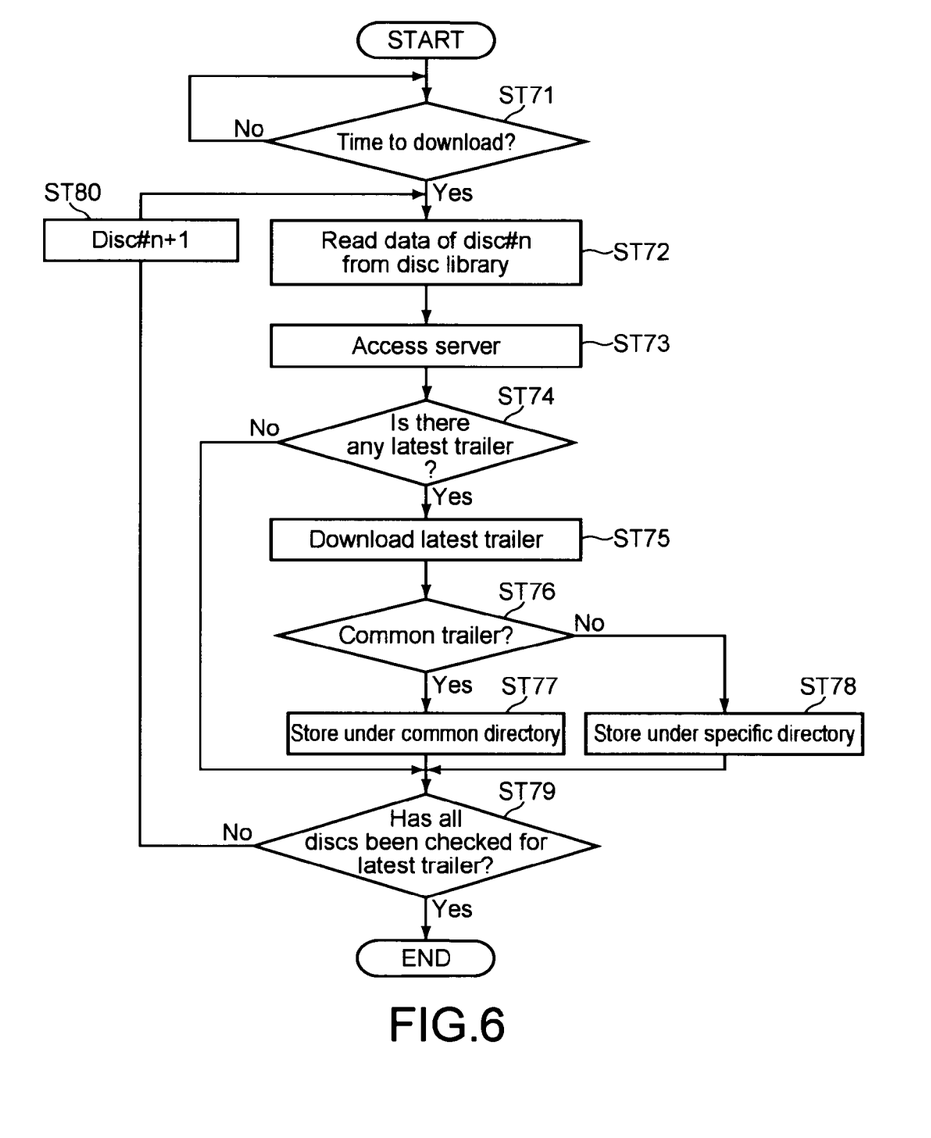
FIG. 6 A flowchart showing a flow of an operation in a case where a resident application downloads a trailer in this embodiment of the present invention.

FIG. 6 is a flowchart showing a flow of an operation in a case where the resident app downloads a trailer. As shown in this Figure, first, the download manager 35 of the resident app determines whether or not it is time to download (Step 71). This download timing is a time such as 12:00 a.m. on each day when the recording/reproducing apparatus 100 is in the stand-by state as mentioned above. Subsequently, the download manager 35 reads, from the disc library DB 34, the metadata regarding a BD-ROM with the disc ID (number)=n under the organization ID=n (Step 72). Then, the download manager 35 accesses the content server 22 using the URL in the read metadata (Step 73).

Subsequently, the download manager 35 determines whether or not the latest trailer is present on the content server 22 (Step 74). This determination as to whether the relevant trailer is the latest trailer or not is performed by the download manager 35 comparing between the trailer list on the content server 22 and the trailer list written in the disc library DB 34. In addition, the download manager 35 also refers to the reproduction/removal history information 36 and performs control to prevent the trailers written in the reproduction/removal history information 36 from being downloaded. That is, let us suppose here that the download manager 35 does not treat the trailers already reproduced by the BD-J app or the resident app and the trailers removed from the local storage 38 as the latest trailers. Accordingly, among the trailers present on the content servers 22, the trailers that are not stored in the local storage 38 and that are not written in the reproduction/removal history information 36 are determined as the latest trailers. It should be noted that this reproduction/removal history information 36 is stored separately between the specific trailers 46 and the common trailers 47. Accordingly, the reproduction and removal of the common trailers 47 are reflected on the BD-ROM(s) to which all the specific trailers 46 bound to those common trailers 47 by the manifest file 44 belong. This process of storing the reproduction/removal history information 36 will be described later.

The download manager 35, when determining that the latest trailer is present (Yes), downloads that latest trailer from the content server 22 (Step 75). Then, the download manager 35 refers to the manifest file 44 present under the specific directory 42 with the disc ID=n in the local storage 38, and thereby determines whether the downloaded trailer is the common trailer or the specific trailer (Step 76).

The download manager 35, when determining that the downloaded trailer is the common trailer (Yes), stores this trailer under the common directory 43 as the common trailer 47 with the organization ID=n (Step 77).

When determining that the downloaded trailer is the specific trailer (No), the download manager 35 stores this trailer under the specific directory 42 as the specific trailer with the disc ID=n under the organization ID=n (Step 78).

When the download manager 35 completes the storage of the latest trailer with the disc ID=n or determines that no latest trailer is present regarding the disc ID=n, the download manager 35 then determines whether or not all the BD-ROMs belonging to the organization ID=n have been checked for the latest trailer (Step 79). When, among the BD-ROMs belonging to the organization ID=n, there remains a BD-ROM that has not yet been checked for the latest trailer (No), the download manager 35 increments the disc ID of the check target by one, and then performs the same process as described above on the BD-ROM with the disc ID=n+1 (Step 80). Moreover, when determining that all the BD-ROMs belonging to the organization ID=n have been checked for the latest trailer, the download manager 35 increments the organization ID of the check target by one, and then performs the same process as described above on the BD-ROMs belonging to the organization ID=n+1. The download manager 35 performs the above-described process on all the BD-ROMs stored in the disc library DB 34.

With the process described above, even when no BD-ROM is inserted in the recording/reproducing apparatus 100, the resident app can access the content server 22 based on the disc library DB 34 and can download the latest trailer in the background. This permits the recording/reproducing apparatus 100 to reproduce an already downloaded trailer without accessing the content server 22 again when a trailer reproduction request occurs from a user; thus, even for cases in which no broadband environment is ready for use by the recording/reproducing apparatus 100, the recording/reproducing apparatus 100 can reproduce a trailer promptly in response to the user reproduction request.

Figure 7:
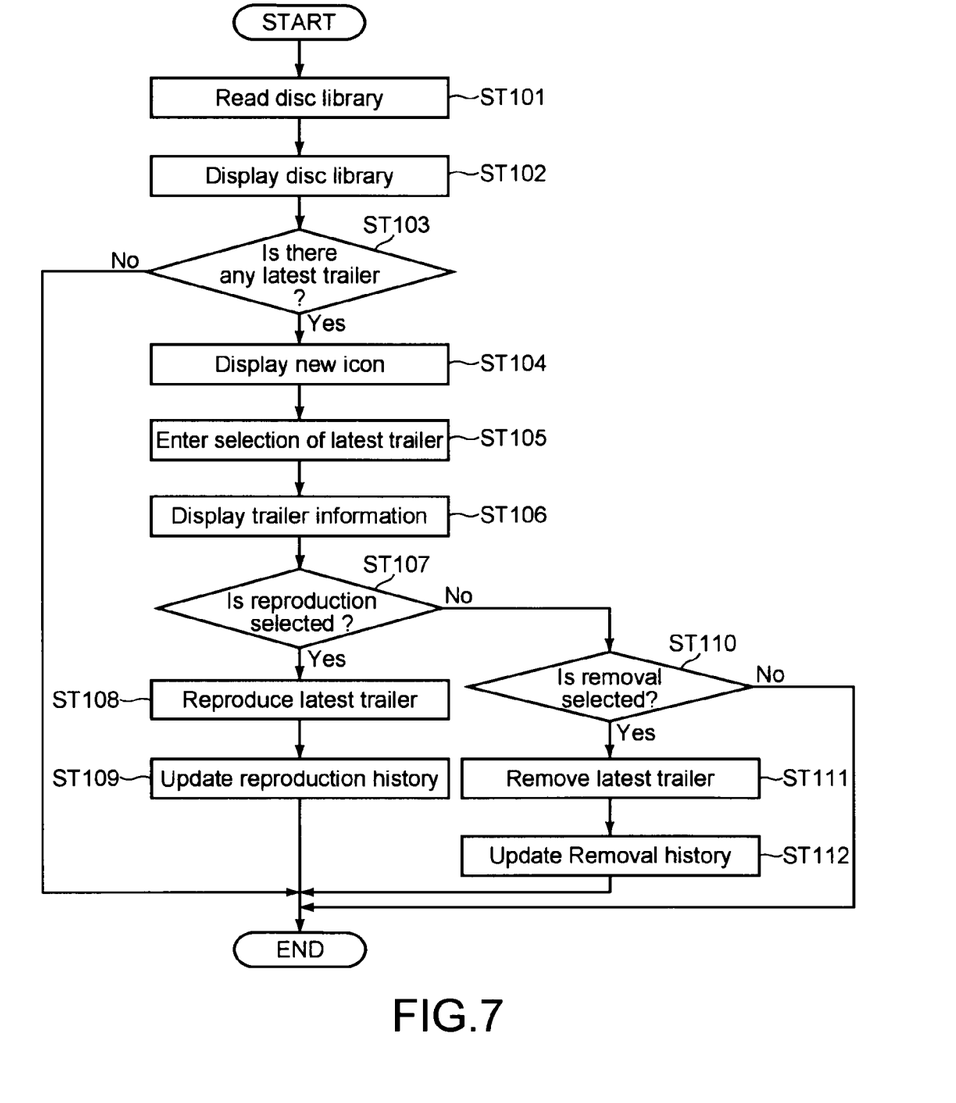
FIG. 7 A flowchart showing a flow of an operation of the resident application for updating trailer reproduction/removal history information in this embodiment of the present invention.

FIG. 7 is a flowchart showing a flow of an operation in which the resident app updates the trailer reproduction/removal history information 36. As shown in this figure, the resident app first reads the disc library DB 34 (Step 101), and then displays the disc library 30 as shown in FIG. 2 on the display portion of the TV 20 (Step 102).

Subsequently, the resident app refers to the disc library DB and the reproduction/removal history information 36 and determines whether, among the trailers stored in the local storage 38, there remain the latest trailers (the specific and common trailers 46 and 47) that have not yet been reproduced (Step 103).

When determining that a latest trailer that have not yet been reproduced is present (Yes), the download manager 35 causes the "New" icon 33 shown in FIG. 2 to be displayed such that the "New" icon 33 superimposed on the disc library 30 (Step 104).

Subsequently, when the operation of selecting the "New" icon 33 is input, for example, by the user operation with a remote controller or the like (Step 105), the resident app causes information related to the latest trailer corresponding to the selected "New" icon 33 to be displayed, for example, as a list box (Step 106).

Figure 8:
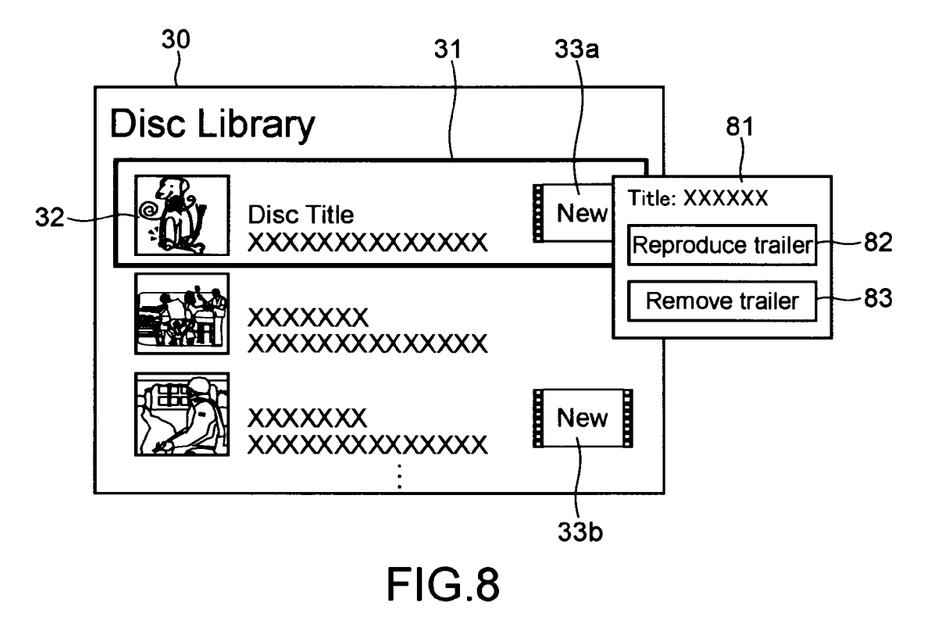
FIG. 8 A diagram showing how a list box is displayed on a disc library in this embodiment of the present invention.

FIG. 8 is a diagram showing how a list box is displayed on the disc library 30. As shown in this figure, for example, when the "New" icon 33a is selected, the resident app displays a list box 81 such that the list box 81 is superimposed on the "New" icon 33a. On the list box 81, information such as the title and cast members of the original content from which the latest trailer corresponding to the "New" icon 33a originates is indicated. Also on the list box 81, other than the information mentioned above, a reproducing button 82 for reproducing the latest trailer and a removing button 83 for removing the latest trailer from the local storage 38 are shown. It should be noted that, when a plurality of the latest trailers are present with respect to one BD-ROM, the information such as a title, the reproducing button 82 and the removing button 83 for each of the latest trailers are displayed as a list.

Returning to FIG. 7, the resident app determines whether or not the reproducing button 82 has been selected on the list box 81 (Step 107), and when determining that the reproducing button 82 has been selected, the resident app reads the latest trailer from the local storage 38 to reproduce the latest trailer (Step 108). In addition, the resident app updates the reproduction history of this reproduced trailer in the reproduction/removal history information 36 (Step 109).

Moreover, the resident app determines whether or not the removing button 83 has been selected on the list box 81 (Step 110), and when determining that the removing button 83 has been selected, the resident app removes the latest trailer from the local storage 38 (Step 111). In addition, the resident app updates a removal history of the removed trailer in the reproduction/removal history information 36 (Step 112). As described earlier, this reproduction/removal history information 36 is stored separately between the specific trailers 46 and the common trailers 47. Thus, on the disc library 30, when the "New" icon 33 is shown in a display section of the BD-ROM with, for example, the disc ID=0 in FIG. 3 and the common trailer 47 is reproduced on or removed from the list box 81 displayed based on the "New" icon 33, that reproduction or removal is also reflected on the display section of the BD-ROM with the disc ID=1. Accordingly, after that common trailer 47 is reproduced or removed, the common trailer 47 is no longer indicated on the list box 81 displayed in the display section of the BD-ROM with the disc ID=0 on the disc library 30. Not only that, but that common trailer 47 is also no longer indicated on the list box 81 displayed in the display section of the BD-ROM with the disc ID=1. Accordingly, also with respect to the common trailer 47, the resident app can prevent repeated watching thereof.

With the process described above, even when no BD-ROM is inserted in the recording/reproducing apparatus 100, the resident app can notify a user of the presence of the latest trailer with the "New" icon 33 on the disc library 30, so that the latest trailer can be reproduced or removed via the "New" icon 33. This permits the recording/reproducing apparatus 100 to increase publicity opportunities for the content providers. Moreover, by storing the reproduction and removal history as the reproduction/removal history information 36 by the resident app, it is possible to prevent unnecessary trailers that a user does not wish to watch from being downloaded or indicated by the "New" icon 33 on the disc library 30, thus eliminating redundancy in watching.

Moreover, by causing the resident app to display the disc library 30, even when no BD-ROM is inserted in the recording/reproducing apparatus 100, each original content and the trailer thereof cab be clearly indicated in connection with the disc thereof. Thereby, user-friendliness is enhanced.

The present invention is not limited to the embodiment described above, but various modifications can of course be made without departing from the gist of the present invention.

In the above-described embodiment, the description is given on a case where the trailers are downloaded as subcontent by the BD-J and resident apps. However, the subcontent is not limited to the trailers. The present invention is also applicable to cases in which various kinds of subcontent is downloaded, such as language subtitle information unrecorded on a BD-ROM, game applications related to the original content on a BD-ROM, "making of" video clips, interview video clips, and event video clips.

In the above-described embodiment, even when the BD-J is running, so long as a reproduction request target trailer has already been downloaded by the resident app, the recording/reproducing apparatus 100 can reproduce the trailer without downloading the trailer again. However, some content providers may have encrypted pay subcontent stored on their content servers 22. Since most pay subcontent is large in file size, it takes quite a while for the recording/reproducing apparatus 100 to finish downloading pay subcontent in response to a reproduction request from a user. In this case, the recording/reproducing apparatus 100 downloads such encrypted pay subcontent in advance by use of the resident app as described above when the apparatus 100 is in the stand-by state. When the BD-ROM is inserted in the recording/reproducing apparatus 100 and a request for reproduction of that pay subcontent is input under the condition that the BD-J app is running, the BD-J app downloads a decryption key for decrypting encryption of the subcontent from the content server 22. Then, the BD-J app reads the pay subcontent stored in the local storage 38, decrypts the pay subcontent with the decryption key, and then reproduces the pay subcontent.

When applied to FIG. 4, these processes will be as described below. In Step 60 in this figure, when it is determined that the trailer has already been downloaded (Yes), the BD-J app performs the following process before reproducing the trailer in Step 65. That is, the BD-J app determines whether the downloaded trailer is pay or not, and when determining that the downloaded trailer is pay, the BD-J app performs a charging process such as credit settlement. Subsequently, the BD-J app determines whether or not the trailer is encrypted, and when determining that the trailer is encrypted, the BD-J app accesses the content server 22 so as to download a decryption key. Subsequently, the BD-J app reads the trailer stored in the local storage 38, and then decrypts that trailer with the decryption key. Then, the BD-J app causes this decrypted pay trailer to be reproduced (Step ST65).

With the process described above, by downloading in advance an encrypted pay subcontent that takes time to be downloaded and performing the processes of charging and decrypting the encryption in a short time, it is possible to promptly reproduce the pay subcontent.

In the above-described embodiment, the manifest file 44 is, for example, downloaded together with the trailer list by the BD-J app under the condition that the BD-J app is running. However, this manifest file 44 may also be downloaded even when no BD-ROM is inserted in the recording/reproducing apparatus 100. Specifically, for example, in FIG. 6, the resident app only needs, when checking the latest trailers and then downloading them (in Step ST75), to download the manifest file 44 together. Moreover, needless to say, the resident app may download the manifest file 44 at a different time from when to download the latest trailers. Accordingly, even when no BD-ROM is inserted in the recording/reproducing apparatus 100, the apparatus 100 can refer to the up-to-date manifest file 44, and can properly sort the specific trailers 46 and the common trailers 47.

In the above-described embodiment, removal of the latest trailer is performed by a user selecting the removing button 83 on the list box 81 displayed on the disc library 30. However, the resident app may not only store the reproduction history but may also remove the latest trailer, for example, every time the latest trailer is reproduced on the disc library 30. This saves a user from having to delete unnecessary trailers.

In the above-described embodiment, the resident app notifies a user of the presence of the latest trailer by displaying the "New" icon 33 on the disc library 30. However, as means for notifying of the presence of the latest trailer, instead of displaying the "New" icon 33, the resident app may give emphasized effects such as highlighted or 3-D look to the display section of each BD-ROM on the disc library 30.

In the above-described embodiment, the description is given on a case in which the recording/reproducing apparatus 100 reads the metadata from a BD-ROM as a recording medium. However, the recording/reproducing apparatus 100 may read the metadata stored on, for example, optical discs such as a DVD-ROM and a CD-ROM, and other recording media such as a memory card using a semiconductor memory, and may download subcontent with none of those media inserted in the recording/reproducing apparatus 100.

In the above-described embodiment, an example is described, in which the present invention is applied to a recording/reproducing apparatus as an electronic apparatus. However, apart from the recording/reproducing apparatus, the present invention is also applicable to any type of electronic apparatus including, for example, television apparatuses, PCs, game apparatuses, and mobile phones.

DESCRIPTION OF SYMBOLS 5 recording/reproducing portion
8 HDD
9 optical disc drive
10 optical disc
11 communication portion
12 CPU
15 operation entry portion
20 television apparatus (TV)
21 Internet
22 content server
30 disc library
33 "New" icon
34 disc library database (DB)
35 download manager
36 reproduction/removal history information
38 local storage
41 organization directory
42 specific directory
43 common directory
44 manifest file
45 latest trailer directory
46 specific trailer
47 common trailer
81 list box
82 reproducing button
83 removing button
100 recording/reproducing apparatus

The invention claimed is:

1. An electronic apparatus, comprising:
   an insertion portion into which a portable recording medium can be inserted, each of such recording media having recorded thereon
      content,
      an application capable of receiving subcontent related to the content from a predetermined location on a network, and
      metadata of the content including location information indicating the predetermined location;
   a reading means for reading the metadata from the recording medium inserted in the insertion portion;
   a receiving means for receiving, when the recording medium is not inserted in the insertion portion, the subcontent from the predetermined location based on the location information in the read metadata, without using the application; and
   a reproducing means for reproducing the subcontent received by the application and the subcontent received without using the application.

2. The electronic apparatus according to claim 1, wherein the metadata includes recording medium identification information for identifying the recording medium, and the electronic apparatus further comprises
   a generation means for generating, based on the recording medium identification information, a content list indicating the content for each of the recording media;
   a output means for outputting a display signal for displaying subcontent identification information for each of the recording media on the generated content list, the subcontent identification information indicating presence of the subcontent that can be reproduced without using the application; and
   an input means for inputting, via the content list, an operation of a user for causing the subcontent corresponding to the subcontent identification information to be reproduced.

3. The electronic apparatus according to claim 2, wherein the electronic apparatus further comprises
   a storage means for storing the subcontent received by the application and the subcontent received without using the application, in correspondence with the recording medium identification information,
   the reproducing means reads, when the operation is input on the content list, the stored subcontent corresponding to the subcontent identification information from the storage means based on the recording medium identification information, to reproduce the subcontent.

4. The electronic apparatus according to claim 3, wherein the output means outputs, when the recording medium is inserted, a display signal for displaying a subcontent reproducing screen on which an operation of a user for causing the subcontent to be received by the application and reproduced is input, and
   the reproducing means reproduces, when the operation is input on the subcontents reproducing screen, the subcontent stored by the storage means without receiving the subcontent by using application.

5. The electronic apparatus according to claim 4, wherein the subcontent is encrypted,
   the receiving means receives, when the operation is input on the subcontent reproducing screen, decryption key information for decrypting the encrypted subcontent from the predetermined location, and
   the reproducing means decrypts the subcontent stored by the storage means with the decryption key information to reproduce the subcontent.

6. The electronic apparatus according to claim 4, wherein the storage means stores reproduction history information of the subcontent for each of the recording media every time the stored subcontent is reproduced, and
   the output means output a display signal for displaying the subcontent identification information indicating, out of the stored subcontent, the presence of the subcontent that has not yet been reproduced based on the reproduction history information.

7. The electronic apparatus according to claim 4, wherein the storage means includes
   means for removing the stored subcontent, and means for storing removal history information of the removed subcontent, and the receiving means receives, out of the subcontent that has not yet been stored, the subcontent other than the removed subcontent, based on the removal history information.

8. The electronic apparatus according to claim 6, wherein the storage means includes
   a first directory that stores, as first subcontent, the subcontent that is different for each recording medium, and
   a second directory that stores, as second subcontent, the subcontent that is common among the recording media, and
   stores, as the reproduction history information, first reproduction history information of the first subcontent and second reproduction history information of the second content.

9. A reproducing method, comprising:
   reading, when a portable recording medium having recorded thereon content, an application capable of receiving subcontent related to the content from a predetermined location, and metadata of the content including location information indicating the predetermined location is inserted, the metadata from the recording medium;
   receiving, when the recording medium is not inserted in the insertion portion, the subcontent from the predetermined location based on the location information in the read metadata without using the application; and
   reproducing the subcontent received by using the application and the subcontent received without using the application.

10. A non-transitory computer readable medium having stored thereon a program that when executed by a computer causes the computer to execute the steps of:
    reading, when a portable recording medium having recorded thereon content, an application capable of receiving subcontent related to the content from a predetermined location, and metadata of the content including location information indicating the predetermined location is inserted, the metadata from the recording medium;
    receiving, when the recording medium is not inserted in the insertion portion, the subcontent from the predetermined location based on the location information in the read metadata; and
    reproducing the subcontent received by using the application and the subcontent received without using the application.

* * * * *